United States Patent
Graf

(10) Patent No.: US 9,586,762 B1
(45) Date of Patent: Mar. 7, 2017

(54) ROTATABLE LONG-BAR HANDLING APPARATUS

(71) Applicant: S&M Precast Inc., Henryville, IN (US)

(72) Inventor: Raymond L. Graf, Memphis, IN (US)

(73) Assignee: S&M Precast Inc., Henryville, IN (US)

( * ) Notice: Subject to any disclaimer, the term of this patent is extended or adjusted under 35 U.S.C. 154(b) by 84 days.

(21) Appl. No.: 14/726,955

(22) Filed: Jun. 1, 2015

Related U.S. Application Data

(60) Provisional application No. 62/141,784, filed on Apr. 1, 2015.

(51) Int. Cl.
  *B65G 47/00* (2006.01)
  *B65G 29/00* (2006.01)

(52) U.S. Cl.
  CPC ...... *B65G 29/00* (2013.01); *B65G 2201/0217* (2013.01)

(58) Field of Classification Search
  CPC ....... B65G 19/00; B65G 29/00; B65G 41/001
  USPC .......... 198/392, 470.1, 478.1, 481.1, 967.11; 414/22.61
  See application file for complete search history.

(56) References Cited

U.S. PATENT DOCUMENTS 7,234,911 B2   6/2007   Kauffman et al.
7,364,397 B2   4/2008   Kauffman et al.

*Primary Examiner* — Gene Crawford
*Assistant Examiner* — Lester Rushin
(74) *Attorney, Agent, or Firm* — Middleton Reutlinger; Robert H. Eichenberger; Chad D. Bruggeman

(57) ABSTRACT

A long-bar handling apparatus that delivers a desired size and shape of long-bar quickly and efficiently for shearing, bending, or further processing. The long-bar is loaded in slots in multiple rotating disk plates. A slot opening and closing mechanism, such as a pivot arm, is utilized to prevent loaded long-bar from falling out of slots during portions of rotation. The slot opening and closing mechanism opens on the top portion of rotation for loading and removing the long-bar for processing.

26 Claims, 9 Drawing Sheets

ROTATABLE LONG-BAR HANDLING APPARATUS

CROSS-REFERENCE TO RELATED APPLICATIONS

This utility patent application claims priority to and benefit under 35 U.S.C. §119(e) of U.S. Provisional Patent Application entitled "Rotatable Long-Bar Handling Apparatus", bearing Application Ser. No. 62/141,784, filed on Apr. 1, 2015, the entire contents of which are hereby incorporated by reference.

FIELD

The present disclosure is directed to methods and machines for use in handling and distributing various types of long-bars to an operator for further processing.

BACKGROUND

Many industries rely on the use of elongated bars of some sort. As used herein, the term "long-bars" is a generic term to describe the general category of elongated elements, such as, but not limited to, rods, solid pipe, hollow pipe, structural members having various cross sectional shapes (e.g., I-beams, U-shapes, Z-shapes, M-shapes, W-shapes, channels, angles, tubes, flat-bars, and the like). Often these long-bars are made of metal, but the general term applies herein equally to those made of any material, including, for example, PVC, other thermoplastics, thermosets, wood, and so forth.

Typically long-bars are manufactured from raw materials and formed in various sizes, shapes, and lengths. These are then shipped to purchasers who use the long-bars for various tasks. Often, the purchasers have a need to handle the long-bars on numerous occasions, to move the long-bars on site from one location to another, to perform processes on the long-bars, and to then use the processed long-bars in, perhaps, new or modified products. The examples of the processes purchasers perform on the long-bars are numerous and commonly understood, and include, but are not limited to, shearing, bending, welding, cutting, threading, and the like. One particular form of long-bar commonly used in many industries is elongated steel rods used to reinforce concrete. These rods, or "rebar", come in many diameters, typically measured in ⅛ inch increments and numbered generally with a reference that identifies the diameter (e.g., a #3 bar is ⅜" diameter; a #4 bar is ⁴⁄₈" or ½" diameter, and so forth). Manufacturers of rebar make the rebar in many lengths, up to and including 72 feet, but can cut the lengths to order in any desired length. Common lengths used by purchasers are 20 feet, 30 feet, and 40 feet, and so on. For the sake of simplicity herein, the specific examples described are shown for the use of steel rebar having already been cut to 20 feet length for feeding into a shearing or bending station, it being understood that the concepts involved are applicable to all forms of long-bar in any length, diameter, shape, and material for any handling or processing of the long-bar.

Currently in many industries it is both labor-intensive and space-intensive to store, handle, and move long-bars. Many industries use, simply, manual labor to do so, involving walking or driving a forklift, skid steer, or similar machine, to retrieve the desired long-bar size; lifting and carrying or transporting the bar to the desired location; and performing the desired further processing on the long-bar. Such manual handling methods are cumbersome, inefficient, uneconomical, and can actually be physically dangerous to the user, especially when large quantities are involved.

Some industries use large, complicated, hydraulic or pneumatic linear feed systems. These systems require a very large footprint and are expensive. They sometimes include conveyors, transfer arms, vibratory shakers, and robotic mechanisms. For certain functions, like descrambling long-bars that are in a jumbled mess, such complicated systems can provide some benefit. However, such systems do not maintain long-bars in categorized fashion and cannot selectively deliver to a user one or more desired long-bars. Moreover, such systems require that the long-bars move across the surfaces of those systems in a sliding manner, causing extreme wear from sliding frictional forces. This makes them susceptible to breakdowns and high maintenance costs.

What is needed is a machine that can simply and effectively hold one or more collections of long-bars and be capable of selectively delivering to a user, at the user's option, a desired one or more of the long-bars in each collection, enabling the desired long-bar to be removed from the machine, yet still retaining the other long-bars in the machine.

SUMMARY

The disclosure herein is directed to a rotary machine that allows for quick and easy handling of different diameters, sizes, and shapes of long-bar. The machine easily loads, stores, and handles different sizes and shapes of long-bar. It is rotatable, in either clockwise or counter-clockwise directions, along an axis substantially parallel to the longitudinal axes of the long-bars that are stored thereon and thus requires only a small footprint.

The apparatus quickly and efficiently delivers the desired size and shape of long-bar stock to the operator. It does this without requiring the operator to change location or to handle the long-bar in any difficult manner or position. This is very advantageous because long-bars can be heavy, such as those made from steel.

The apparatus has a small footprint relative to prior art handling systems. This frees up valuable floor space that can then be utilized for other purposes, and provides for greater manufacturing efficiency. This more compact handling and feeding system also helps reduce the manufacturing time per item and/or can increase the quantity of items that can be manufactured in a given period of time. The end result is lower manufacturing costs, a more competitive product, and greater profitability.

The apparatus significantly reduces the amount of, as well as the degree of difficulty in, manually handling long-bar over prior art systems. This is significant, especially when the long-bar material is metal and is heavy. Reducing the amount of manual labor as well as the handling difficulty and the strength requirements results in lower manufacturing costs and benefits worker health and safety as well. It also reduces the time to retrieve and switch between different sizes and shapes of long-bar, which lowers manufacturing costs and increases profitability.

The apparatus avoids the need for any form of untangling machinery whatsoever. The long-bars are placed in the apparatus purposefully and deliberately by an operator, and the apparatus keeps the loaded long-bars tangle free due to the rotation of the long-bars in the machine. Other features and advantages will be apparent from the following more detailed description of a preferred embodiment, taken in conjunction with the accompanying drawings, which illustrate an exemplary machine and method, according to the principles of the invention.

DETAILED DESCRIPTION OF THE PREFERRED EMBODIMENT

Figure 1A:
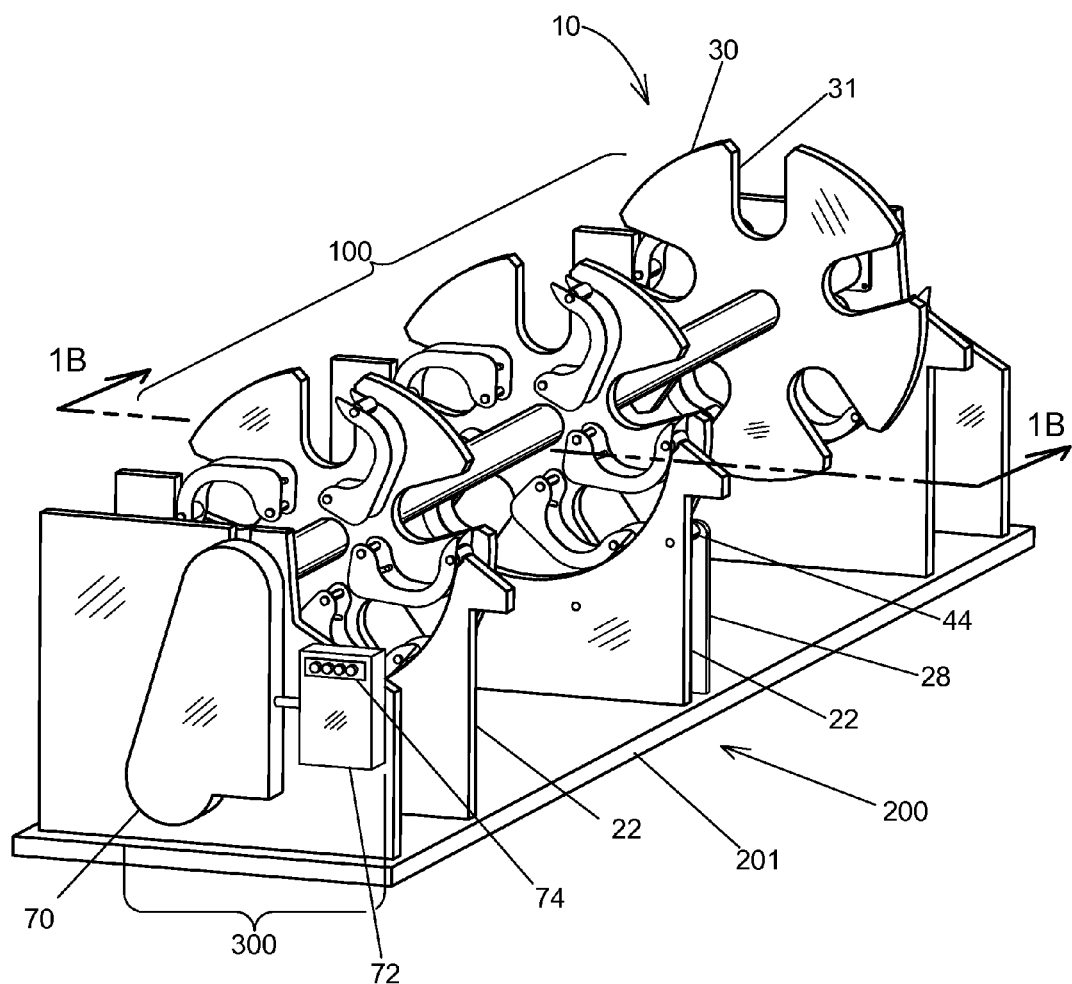
FIG. 1A is a perspective view of an apparatus for handling long-bar according to an embodiment of the present invention, shown without any long-bar loaded.

FIG. 1A shows an overall perspective view of a basic version of the apparatus 10 according to a preferred embodiment. The apparatus 10 comprises three main areas: a rotating assembly 100; a frame and support structure 200; and a rotary drive assembly or section 300.

The rotating assembly 100 comprises at least two rotating slot plates 30 for receiving and holding long-bars therein. The embodiment shown in FIG. 1A comprises three slot plates 30, but other numbers can be included. For example, for shorter long-bars, embodiments having only two slot plates are possible. For longer long-bars, embodiments having four or more slot plates 30 are possible. For each slot 31 in the slot plate 30, one or more closures, or pivot arms 34 as shown, is provided for selectively opening and closing access to slot 31, as described more fully below.

The frame and support structure 200 comprises a base 201, one or more cam roller plates 22, and one or more roller bearing plates 28 upstanding from the base 201. In lieu of the frame and support structure 200 being one piece and connected together by a base plate, the frame and support structure 200 could alternatively be divided into two or more smaller frame and support structures. The smaller structures can then be assembled, shimmed, and aligned on a solid foundation at installation as desired. Further, the frame and support structure 200 could be adapted for mounting on a mobile support or itself being mobile, such that the apparatus 10 can be moved to different locations.

The rotary drive section 300 comprises, generally, a rotary drive 70 and controls 74, with or without a control box 72. These components can take many forms, depending on the size and weight requirements of the expected loads, as well as user-preferences and desired features. The rotary drive 70 can be mechanical, electrical, hydraulic, pneumatic, gas-driven, and so forth. The control box 72 and controls 74 can take any form and design as is commonplace for activating and operating machinery of this type. The controls 74 can be located at any location, on a pendant, on a cable, or wireless, for example.

Figure 1B:
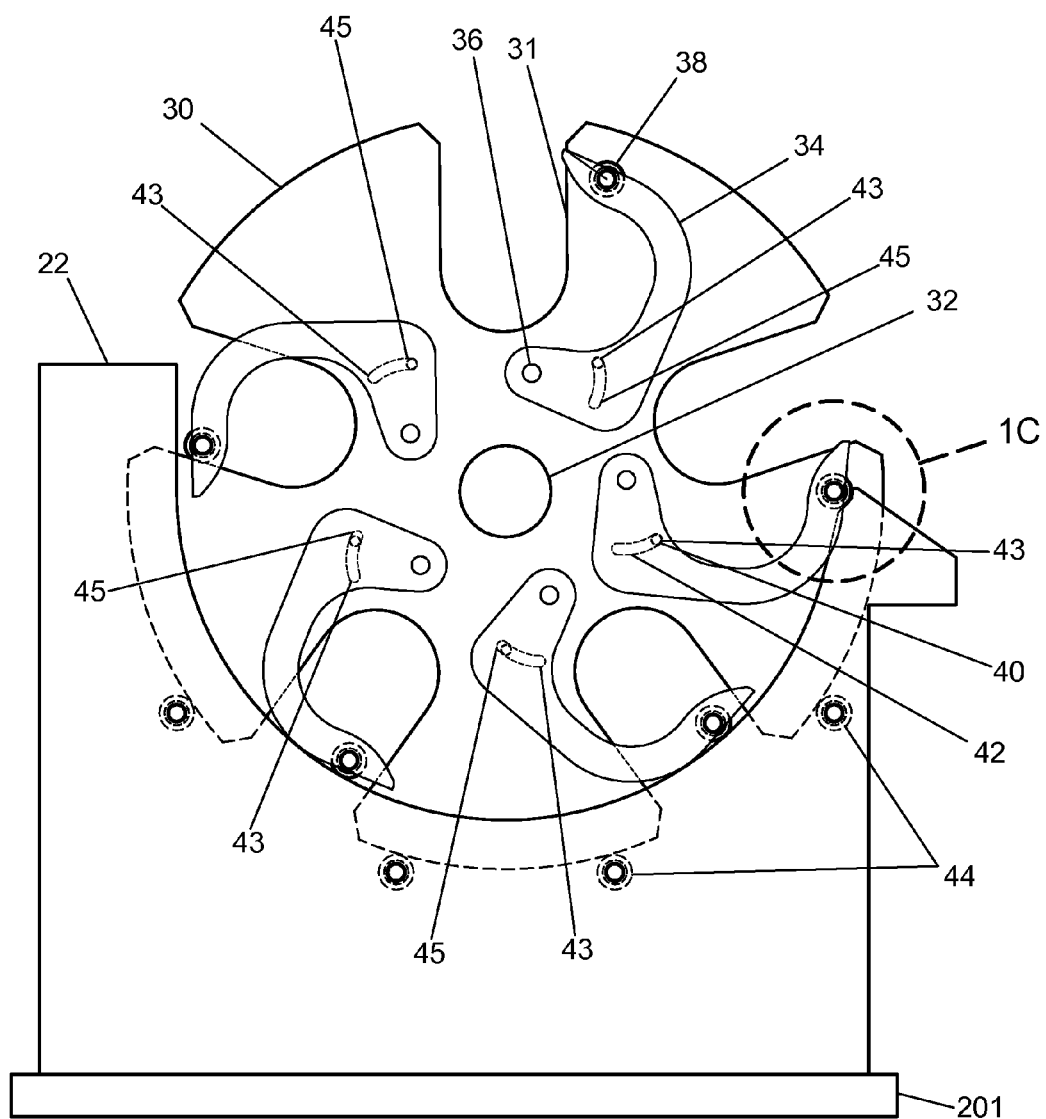
FIG. 1B is a section view of FIG. 1A.

FIG. 1B shows a section view of FIG. 1A. A rotating slot plate 30 is connected to and rotates with a rotating axle, arbor, or shaft 32. In the preferred embodiment shown, the slot plate 30 comprises five slots 31. Each of these slots 31 has associated therewith a closure, or pivot arm 34. Obviously other numbers of slots 31 are possible for the machine, depending on needs of the user, including one, two, three, four, six, or more.

Pivot arms 34 are movable from a closed position to an open position, and vice versa, around each pivot arm axis of rotation (pivot arm hinge pin 36). In the embodiment shown, the slot plate 30 rotates clockwise, and gravity moves the pivot arms 34 to an open position when the center of mass of each pivot arm 34 switches from the left side of its hinge pin 36 to the right side of its hinge pin 36. That is, when the slot plate 30 is rotating clockwise, when the center of mass of each pivot arm 34 moves from a trailing position to a leading position with respect to the hinge pin in the direction of rotation. This occurs approximately when rotary slot plate 30 rotates the pivot arm 34 to the approximate location as designated at location "E" in FIG. 3C. In this embodiment, the range of motion from open to closed position is approximately 40 degrees, but obviously varies based on design. As shown in FIG. 3C a first range R1 is the range of rotational positions wherein a single pivot arm 34 occupies the open position, and a second range R2 is the range of rotational positions wherein of a pivot arm 34 occupies the closed position. It is equally possible for the slot plate 30 of this embodiment to rotate counter-clockwise. In this event, gravity moves pivot arms 34 to a close position and keeps the arms 34 closed until the rotation moves into position wherein the pivot arm roller 38 makes contact with the surface 23 of the cam roller plate 22 (at approximately location "D" in FIG. 3C). The cam roller plate 22 then keeps the pivot arms 38 closed until the rotation progresses far enough for the pivot arm roller 38 to exit the notch 24, as described below. In the embodiment shown, the pivot arm roller notch 24 and the cam roller plate 22 move the pivot arms 34 to a closed position, as will be described below.

In an open position, the pivot arm 34 is oriented in such a manner as to not substantially block the entrance to the slot 31. In a closed position, the pivot arm 34 is oriented in such a manner as to substantially block the slot 31 opening. Therefore, when open, the pivot arm 34 allows long-bar 52 to be loaded into or removed from the slot 31. When closed, the pivot arm does not allow long-bar 52 to be loaded into, or removed from, the slot 31. Therefore, in FIG. 1B, two pivot arms 34 are shown in the open position and three pivot arms 34 are shown in the closed position. Other types of opening and closing arms, closure mechanisms, and methods can be used. One alternative embodiment could have sliding opening and closing bars in lieu of a pivoting arm or bar. Another alternative embodiment utilizing a different slot opening and closing method would be an opening and closing bar that is pinned not at the bottom and below the slot 31, as shown, but is pinned at the top opening edge of the slot 31. In FIG. 1B the pinned location would be near the location of roller 38. The length of the opening and closing bar would be a little more than the width of the slot 31. In the open position the axis of the opening and closing bar would be at 90 degrees to the plane of the paper for FIG. 1B. This is in the same direction and aligns with long-bar 52 when loaded in the apparatus. In the closed position the opening and closing bar would rotate 90 degrees across the top opening of the slot 31.

A spring mechanism also could be utilized to open the bar, and a cam and track means, similar to the preferred embodiment, could be utilized for closing the bar. This is just one alternative design for many slot-opening and slot-closing arms or bars that would prevent the long-bar 52 from falling out of the slot on the downward portion of rotation while also eliminating frictional forces and wear. If it were not for the closure mechanism, the long-bar 52 would be allowed to drop out of the slot 31 when the slot 31 was in a downward orientation, and the long-bar 52 would come into contact with the curved part of cam roller plate 22. Then, as the slot plate 31 continued to rotate, the long-bar 52 would be forced to slide across the curved surface 23 of cam roller plate 22, thus encountering significant frictional forces and wear.

In the embodiment shown, each pivot arm 34 pivots on a pivot arm hinge pin 36, which is pinned to slot plate 30. A pivot arm roller 38 is attached to the end of pivot arm 34. FIG. 1E shows an alternative embodiment having a single, common hinge pin 36 that connects each slot plate 30. A pivot arm stop pin 40 connected to rotating slot plate 30 limits the rotation of pivot arm 34. The pivot arm stop pin 40 resides inside a stop pin slot 42. The stop pin slot 42 has a slot length defined by first terminal slot end 43 and second terminal slot end 45. These structures could be reversed instead, with the hinge pin 36 being connected to the arm 34 and the stop pin slot 42 being located in the slot plate 30. Other common methods and structures for limiting rotation could easily be employed.

Multiple slot plate rollers 44 are attached to the frame and support structure 200, preferably to the roller bearing plate 28. In the embodiment shown in FIG. 1B, four slot plate rollers 44 are sandwiched between roller bearing plate 28 and the center cam roller plate 22. The slot plate rollers 44 provide vertical support to, in this embodiment, the center rotating slot plate 30. In this fashion, since the slot plate rollers 44 support the load, the rotating shaft 32, and therefore the rotary drive 70 need not handle enormous loads, especially when the apparatus 10 contains a full complement of long-bars in each slot 31. In this manner, the shaft 32 and rotary drive 70 can be optimized in size. Alternatively, if slot plate rollers 44 are not used, the apparatus 10 could be used if the rotating shaft 32 were sized accordingly to handle the increased load due to the elimination of the slot plate rollers 44.

The number and spacing of the slot plate rollers 44 depend on several factors, including the diameter of the slot plate 30, the number of slots 31, the weight of the slot plates 30, and other factors. Because the slot plate 30 rolls over the slot plate rollers 44, the slot plate rollers 44 are located to tangentially contact the outer surface of the slot plate 30. In the embodiment shown, it is desired to maintain vertical support to the slot plate 30 throughout the full 360 degree rotation thereof. Therefore, the lower slot plate rollers 44 are spaced apart along the circular arc of the slot plate 30 at an arc distance designed to always have at least two slot plate rollers 44 contacting the slot plate 30 at all times—one to the left of the center of rotation of the slot plate 30 and one to the right of the center of rotation. Additional slot plate rollers 44 can be included as desired. Preferably, the slot plate rollers should be of a sufficient number so that at least two are in contact with the slot plate 30 at all times. One of those in contact should ideally be on one side of the center of gravity of the rotating assembly, and the other on the other side. Therefore, preferably, at least four are used, and the spacing would be different than the distance between the slot openings so that at least two rollers, one on each side of the center of gravity, would be in contact with the slot plate 30 at all rotational positions of the slot plate 30.

With regard to the pivot arm 34, the center of mass changes position relative to shaft 32 as the slot plate 30 rotates. The pivot arms 34 will try to rotate any time there is a horizontal offset between the pivot arm 34 center of mass and its pivot arm hinge pin 36. This holds true in either the clockwise rotation or counter-clockwise rotation of the slot plate 30. What keeps the pivot arm 34 from rotating at the majority of rotational positions of the slot plate 30 is a stopping means such as the pivot arm stop pin 40. There is a rotational position of the slot plate 30 for each specific arm 34 where its center of mass offset (with respect to a vertical line that goes through the center of the hinge pin 36) starts to move from one side of this vertical line to the other side. When the center of mass offset is sufficient to overcome frictional resistance (of the pivot arm—from rotating) the pivot arm 34 at that rotational position will start to flip (when rotated clockwise) from the closed to open position or vice versa. Besides gravity, a spring attached to the arms could be incorporated as well to assist opening or closing the arms. Further, a cam means to assist or to time the opening and closing of the arms at the desired rotational position of the slot plate could also be utilized. There are many ways and means to accomplish the above, but a simple way is to utilize gravity, as shown in the apparatus 10 described.

As described, FIGS. 1A and 1B show the location of four slot plate rollers 44. The rollers 44 are shown pinned between roller bearing plate 28 and cam roller plate 22. The four rollers 44 support and hold up the center slot plate 30 while allowing it to rotate. Utilizing rollers 44 to help support the weight of the rotating assembly as well as the weight of the loaded long-bars 52 reduces the bending load on shaft 32, which allows for a less expensive and smaller diameter shaft 32. Rollers 44 could be eliminated if the shaft 32 is designed to support the total weight of the rotating assembly and loaded long-bars 52, but this is less preferred. Rollers 44 can also be placed under the other plates 30 if desired, as opposed to just under the center slot plate 30 as shown in FIG. 1A.

Figure 1C:
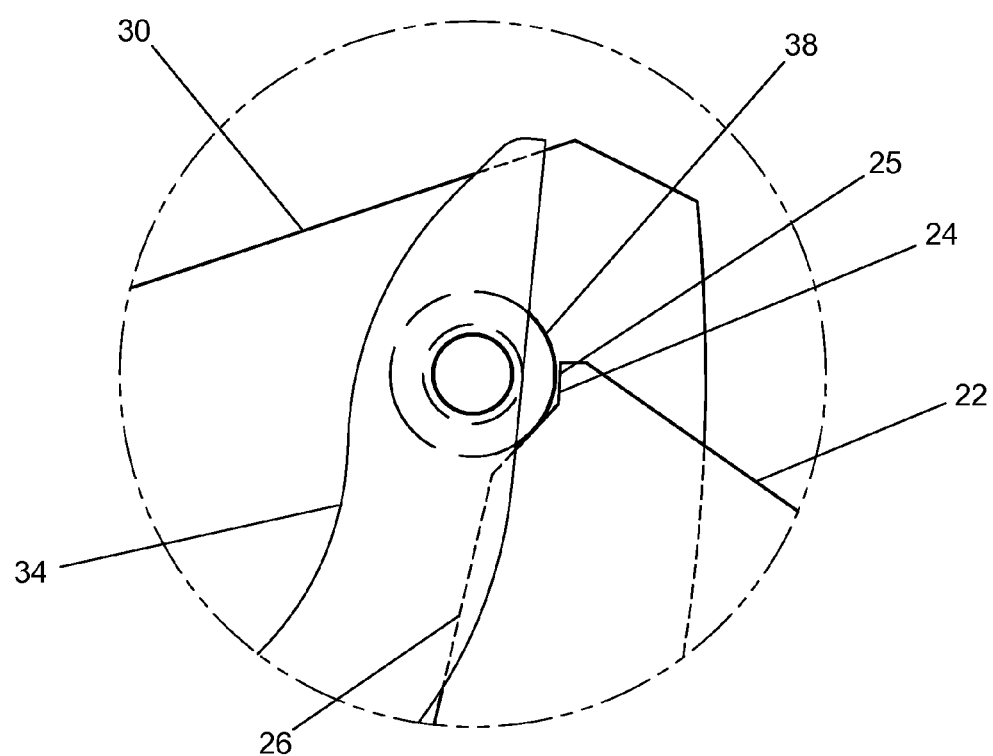
FIG. 1C is an enlarged detail view of a portion of FIG. 1B.
Figure 1D:
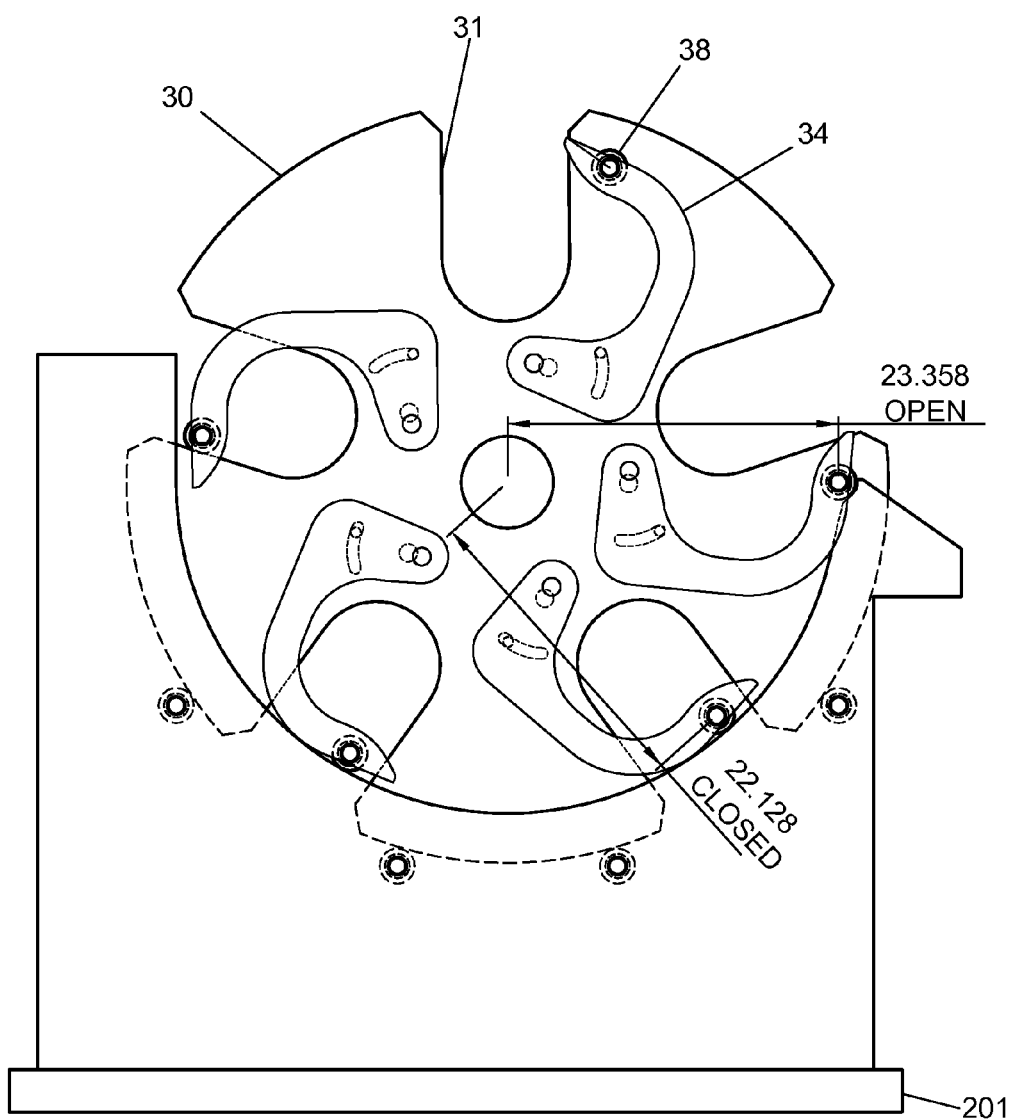
FIG. 1D is the same section view of FIG. 1B, but showing a comparison between the arm in the closed and in the open positions.
Figure 1E:
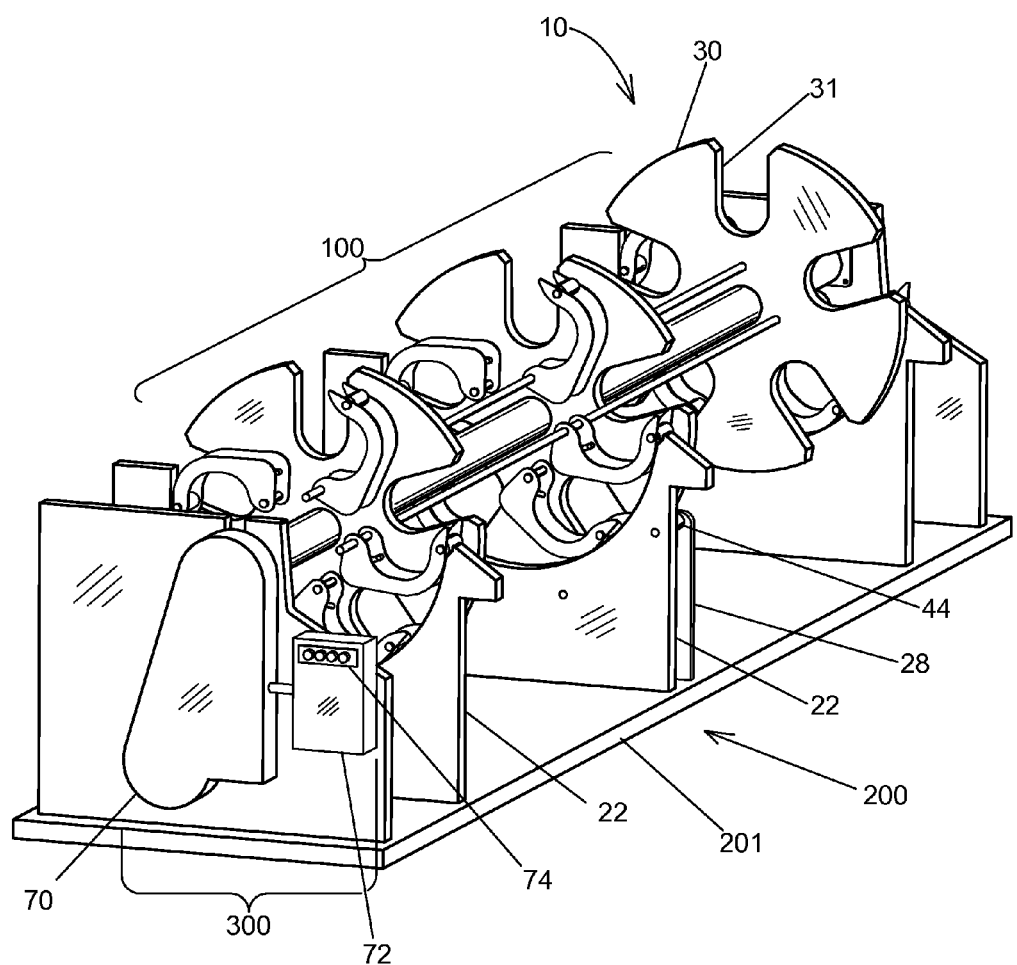
FIG. 1E is a perspective view of an embodiment having a common hinge pin connecting each slot plate.

FIG. 1C shows an enlarged detail of a portion of FIG. 1B. The detail shows a pivot arm roller notch 24 that is cut into cam roller plate 22. This pivot arm roller notch 24 serves to receive the pivot arm roller 38 as the slot plate 30 rotates. The pivot arm roller notch 24 has a first surface 25 and a second surface 26. With reference to FIGS. 1B and 1C it can be seen that as the slot plate 30 rotates clockwise, with any given slot 31 at the top of the rotation, the respective pivot arm 34 is in an open position (in these figures, refer to the pivot arms 34 located at approximately the 1 o'clock and 3 o'clock positions). As the pivot arm 34 rotates to approximately a 3 o'clock, its pivot arm roller 38 makes initial contact with the pivot arm roller notch 24 (FIG. 1C). As the slot plate 30 continues to rotate, the pivot arm 34 rotates about its own pivot arm hinge pin 36, and as this happens the pivot arm stop pin 40 moves inside the stop pin slot 42. As the rotary slot plates 30 continue to rotate clockwise, the pivot arm roller notch 24 stops the free end of pivot arm 34 from continuing to rotate with the slot plate 30. This causes the pivot arm 34 at slot position "B" to start to close as shown in FIG. 3B. This movement continues until the slot plate 30 has rotated sufficiently to move the pivot arm 34 into the closed position. When the pivot arm 34 fully closes at slot position "B" the roller 38 slips out of the notch 24 and starts rotating again with the slot plates 30. In the closed position, the distance from the center of the slot plate 30 to the outer surface of the pivot arm roller 38 (i.e., to the second surface 26) is less than the same distance when the pivot arm is in the open position (i.e., to the first surface 25). FIG. 1D shows this for a preferred embodiment. As shown, once the pivot arm 34 moves to the closed position, the pivot arm roller 38 then rides along the surface 23 of the cam roller plate 22 (FIGS. 1B and 1D).

Figure 3A:
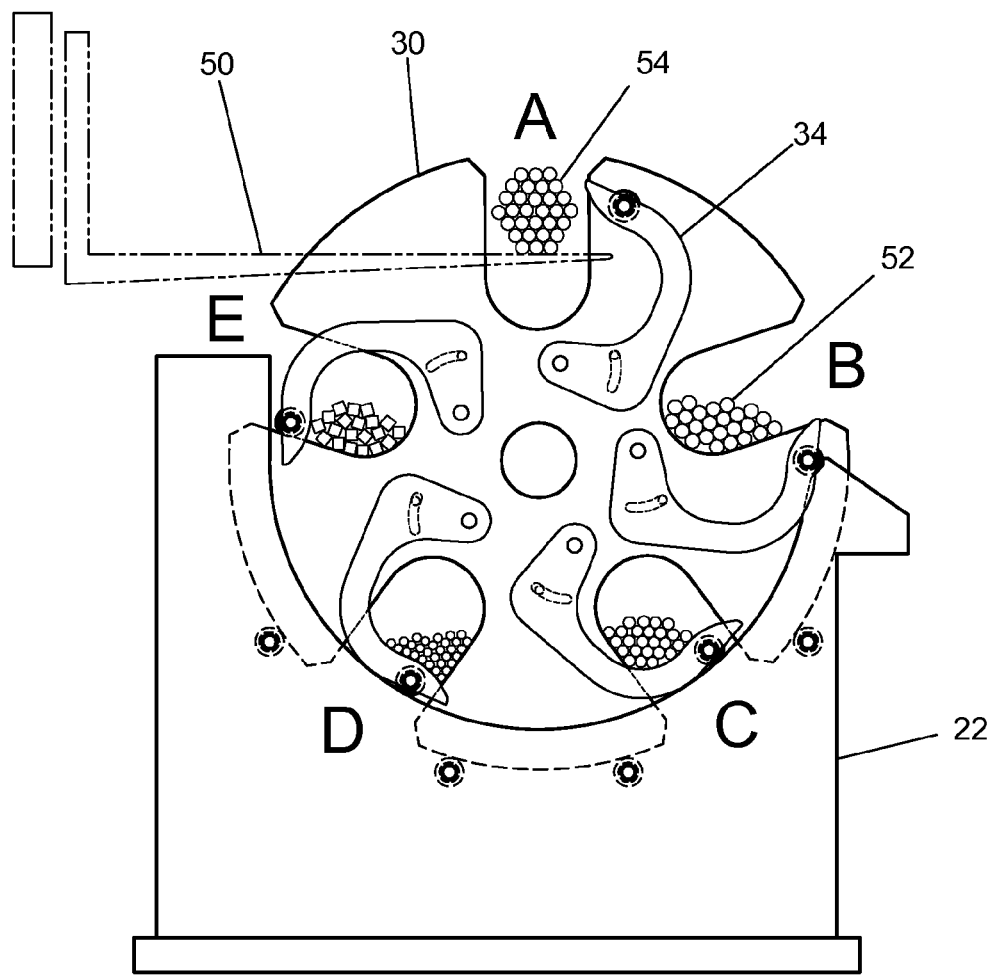
FIG. 3A is the same section view shown in FIG. 1B, but with a bundle of long-bar being loaded on the apparatus.
Figure 3B:
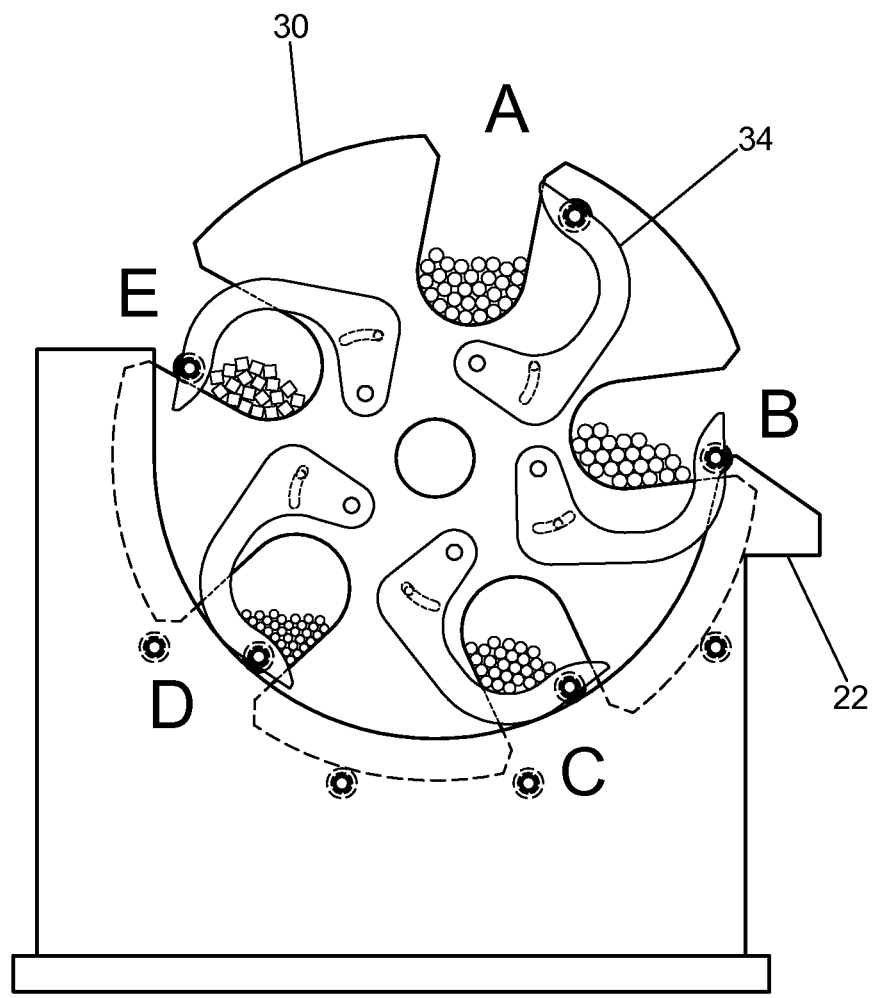
FIG. 3B is the same section as FIG. 3A, but shown when the apparatus has rotated to a different rotational position.
Figure 3C:
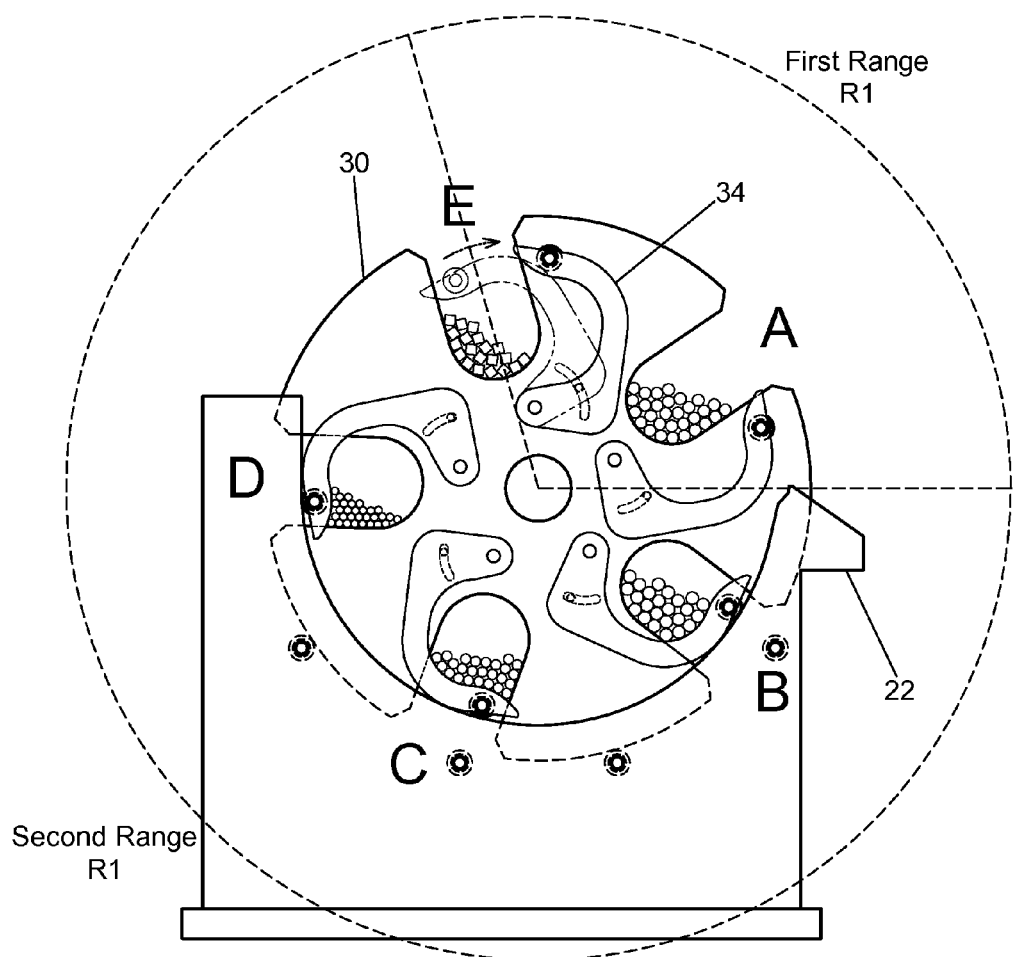
FIG. 3C is the same section as FIG. 3B, but shown when the apparatus has rotated to yet a further rotational position.

The cam roller surface 23 of cam roller plate 22 keep the pivot arm 34 closed while the slot 31 rotates from slot position "C" to slot position "E" as shown in FIG. 3A. This prevents long-bars 52 from escaping or being removed from the apparatus. From slot position "E" until just before slot position "A" gravity is sufficient to keep the pivot arm 34 in the closed position.

Figure 2A:
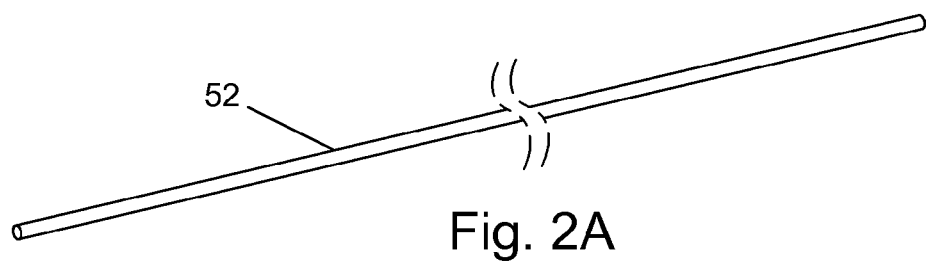
FIG. 2A is a perspective view of a representative single piece of a long-bar stock.
Figure 2B:
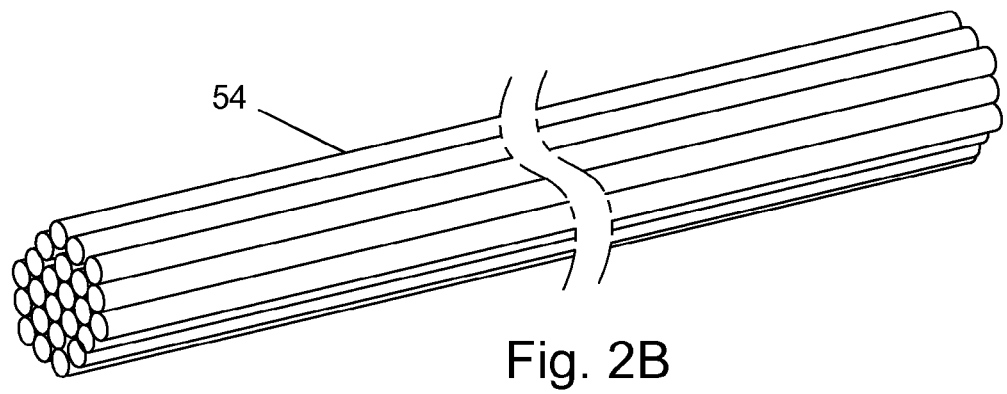
FIG. 2B is a perspective view of a representative bundle of long-bar stock.

FIG. 2A shows a representative single piece of long-bar 52. FIG. 2B shows a representative bundle of long-bar 54. As used herein, references to long-bar 52 and bundles of long-bar 54 are used interchangeably.

FIG. 3A shows the same section view that is shown in FIG. 1B with slot 31 positions at locations "B", "C", "D", and "E" loaded with different sizes and shapes of long-bar 52. A bundle of long-bar 54 is shown being lowered into slot 31 at position "A" by forklift forks 50. Pivot arm 34 is shown in the open position at slot positions "A" & "B" and in the closed position at slot positions "C", "D", & "E". Slot plate 30 is shown in FIG. 3A being supported by four slot plate rollers 44 that are positioned between, and pinned to, cam roller plate 22 and roller bearing plate 28. These plates are shown in the perspective view of FIG. 1A.

FIG. 3B shows the section view of FIG. 3A with the loaded long-bar 52 and slot plate 30 having been rotated approximately 20 degrees clockwise relative to its position in FIG. 3A. FIG. 3C shows the section view of FIG. 3A loaded with long-bar 52 and with slot plate 30 having been rotated approximately 55 degrees clockwise relative to its position in FIG. 3A.

In FIG. 3B pivot arm 34 is shown at slot position B rotated to a position halfway across the slot opening. The pivot arm 34 has halfway closed the slot opening. The notch 24 (FIG. 1C) is keeping the distal end of the pivot arm 34 in place as the slot plate 30 is continuing to rotate. So as the slot plate 30 is rotating, the notch is causing the pivot arm 34 to close the slot opening at slot position B in FIG. 3B. The design of the pivot arm 34 is such that as the slot plate 30 continues to rotate, the other side or edge of the slot 31 at the slot B position reaches the end of the pivot arm 34 and notch. At this position the pivot arm 34 at slot position B has closed the slot opening. Now at this point as the slot plate 30 continues to rotate, the pivot arm pin 36 has moved enough to force or pull the pivot arm roller 38 from the notch and the end of the pivot arm 34 starts to rotate again with the rest of the slot plate 30. And now at this point the cam roller plate 22 is designed to keep the pivot arm 34 closed when the slots are on the downward part of the rotation, thus retaining the long-bars 52.

In use, the apparatus 10 can deliver a specific size and shape of long-bar 52 to an operator for processing (e.g., cutting, bending, threading, etc.) or for delivery for the next operation or step in a manufacturing or construction process. The apparatus 10 is first loaded with, if desired, different sizes and shapes of long-bar 52. The long-bar 52 is conveniently loaded by lowering the long-bar 52 into the open slots 31 shown in FIG. 1A. The slots 31 in each of the slot plates 30 shown in FIG. 3A can each be rotated, using the controls 74, to the top vertical or near vertical slot position and loaded with a specific size and shape of long-bar 52.

The operator controls the rotation and operation of the apparatus by the controls 74. The controls 74 are connected to a control box 72 that controls a rotary drive 70. Rotary drive 70 is connected to shaft 32 and to which slot plates 30 are connected.

When the apparatus is loaded, the operator retrieves a specific long-bar 52 by rotating the slot plates 30 so that the slot in which the desired long-bar 52 is located, is at a position convenient for removal, by hand or by machine, such as at slot position "B" as shown in FIG. 3A. The operator and/or workman then conveniently removes the long-bar 52 from the slot at slot position "B".

The apparatus 10 conveniently handles and stores long-bars 52 in slots 31 in rotating plates 30 and prevents the long-bar 52 from falling out of the slots 31 when the slots are rotated in the downward position. The apparatus 10 prevents loaded long-bar 52 from falling out of the slot 31 openings on the bottom and downward portion of rotation by utilizing pivot arms 34 that close on the downward portion and open on the top portion of rotation. Since pivot arms 34 rotate with the long-bars 52, it greatly reduces the frictional forces and wear that would be associated with a stationary plate, vibratory plate, or other form of the prior art devices that use a stationary plate in lieu of pivot arms 34 or that otherwise require the long-bars 52 to slide across a surface. For example, in FIG. 3A, at slot locations C and D, if one were to remove the pivot arm 34 at C and D, the long-bar would drop until it came into contact with the surface 23 of cam roller plates 22. In that event, the long-bars 52 would actually be directly engaging the surface 23 of the cam roller plate 22, and as the slot plates 30 are rotated, considerable sliding friction would be generated between the rotating rebar and the stationary (not rotating) plates 22. In the apparatus 10, however, the long-bars 52 are held by the pivot arms 34, which rotate with the slot plate 30 and long-bars 52, and prevent the long-bars 52 from contacting the surface 23 of the cam roller plate 22. That is, the long-bars 52 rest against the inside surface of the pivot arms 34, which rotates with the long-bars 52. This greatly reduces the sliding friction that would otherwise happen. And, if desired a more frictionless material and part could be utilized for the long-bar 52 to slide against if the pivot arms 34 were eliminated.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended to the application once filed as a non-provisional application.

What is claimed is:

1. A rotatable device comprising:
    a drive shaft;
    a generally circular slot plate mounted to said drive shaft having at least one slot therein interrupting an outer edge of said generally circular slot plate;
    a closure having a first end and a second end, wherein said first end is rotatably mounted to said slot plate and said second end further comprises a pivot arm roller, wherein said second end rotates between a first position blocking access to said at least one slot and a second position allowing access to said at least one slot;
    a cam roller plate having a concave curved cam roller plate surface for contacting said pivot arm roller of said closure to move said second end of said closure from said second position to said first position.

2. A rotatable device comprising:
    a support structure having a base and at least two upstanding cam roller plates connected thereto, each of said at least two cam roller plates having a concave curved cam roller plate surface;
    a rotary drive assembly having a rotary drive, a drive shaft connected to said rotary drive, and controls therefor, wherein said rotary drive turns said drive shaft in a first rotating direction;
    a rotating assembly having at least two slot plates connected to said drive shaft and separated from each other by a first distance along said drive shaft, each of said at least two slot plates having an outer circumferential surface, and each of said at least two slot plates having at least one slot therein interrupting said outer circumferential surface of each of said at least two slot plates; and
    a closure having a first end and a second end, wherein said second end is alternately movable from a first position to a second position, wherein in said first position said closure blocks access to said slot and in said second position said closure allows access to said slot.

3. The device according to claim 2 wherein each of said concave curved roller plate surface of said at least two cam roller plates further comprises a notch therein.

4. The device according to claim 3 wherein said notch further comprises a first surface and a second surface, said first surface having a first distance from the center of said drive shaft and said second surface having a second distance from the center of said drive shaft.

5. The device according to claim 4 wherein said second distance is less than said first distance.

6. The device according to claim 2 wherein each of said closure is pivotably mounted about a hinge pin on each of said at least two plates.

7. The device of claim 6 wherein said hinge pin for each closure on one of said at least two slot plates is common to a corresponding hinge pin for each closure on another one of said at least two slot plates.

8. The device of claim 7 wherein each said hinge pin connects each of said at least two plates.

9. The device of claim 6 wherein each of said closure further comprises a pivot arm roller.

10. The device according to claim 9 wherein as said drive shaft rotates, each of said at least two slot plates correspondingly rotate about a drive shaft axis of rotation.

11. The device according to claim 10 wherein said closure occupies said first position at some rotational positions of said at least two slot plates and occupies said second position at other rotational positions of said at least two slot plates.

12. The device according to claim 11 wherein gravity moves said closure from said first position to said second position upon rotation of said drive shaft in said first rotating direction when a center of mass of said closure is horizontally offset from said hinge pin in a position ahead of said hinge pin in the first rotating direction.

13. The device according to claim 12 wherein one of said closure or said at least two slot plates further comprises a slot, and the other of said closure or said at least two slot plates further comprises a pin for engagement within said slot.

14. The device according to claim 13 wherein said slot has a slot length further comprising a first terminal slot end and a second terminal slot end.

15. The device according to claim 14 wherein as said at least two slot plates rotate in a first range of positions, said pin contacts said first terminal slot end and said closure occupies said second position allowing access to said slot from said outer circumferential surface.

16. The device according to claim 15 wherein as said at least two slot plates rotate to a beginning of said second range of positions, said pivot arm roller contacts said notch, wherein further rotation of said at least two slot plates occurs while said pivot arm roller resides at said first surface as said pin moves from said first terminal slot end toward said second terminal slot end.

17. The device according to claim 16 wherein once said pin abuts said second terminal slot end, said second end of said closure occupies said first position blocking access to said slot from said outer circumferential surface.

18. The device according to claim 2 wherein each of said closure is movable in a manner selected from the group consisting of slide action, cam action, and spring action.

19. The device according to claim 2 wherein said support structure further comprises a roller bearing plate.

20. The device according to claim 19 wherein said roller bearing plate further comprises at least two slot plate rollers that each receive an outer surface of one of said at least two slot plates.

21. The device according to claim 20 wherein said roller bearing plate further comprises four slot plate rollers.

22. The device according to claim 2 wherein support structure is mobile.

23. The device according to claim 2 wherein said rotary drive drives said shaft in a second rotary direction opposite said first rotary direction.

24. The device according to claim 2 wherein each of said at least two slot plates further comprises five slots therein.

25. The device according to claim 6 wherein said hinge pin is located adjacent one end of said slot opening.

26. A method of distributing long bars to a user comprising the steps of:
   utilizing a rotating device having a rotating shaft and slot plates connected to said rotating shaft, wherein each of said slot plates has a plurality of slots therein for receiving long-bars, and wherein each of said slot plates further comprises a plurality of closures thereon, each of which corresponding to a particular one of said plurality of slots, wherein said plurality of closures are alternately movable from a first position blocking access to said slots to a second position allowing access to said slots;
   rotating said rotating device to a rotational position in which at least one of said plurality of closures is in said second position;
   inserting long-bars into or removing long-bars from the slot of said plurality of slots corresponding to said closure that is in said second position;
   rotating said rotating device to a rotational position in which said at least one of said plurality of closures moves from said second position to said first position.

* * * * *